(12) United States Patent
Löbig

(10) Patent No.: US 7,372,869 B2
(45) Date of Patent: May 13, 2008

(54) DEVICE AND METHOD FOR THE PACKET BASED ACCESS OF CLASSICAL ISDN/PSTN SUBSCRIBERS TO A SWITCHING SYSTEM

(75) Inventor: Nobert Löbig, Darmstadt (DE)

(73) Assignee: Siemens Aktiengesellschaft, Munich (DE)

( * ) Notice: Subject to any disclaimer, the term of this patent is extended or adjusted under 35 U.S.C. 154(b) by 1099 days.

(21) Appl. No.: 10/450,881

(22) PCT Filed: Nov. 12, 2001

(86) PCT No.: PCT/DE01/04238

§ 371 (c)(1),
(2), (4) Date: Nov. 6, 2003

(87) PCT Pub. No.: WO02/51195

PCT Pub. Date: Jun. 27, 2002

(65) Prior Publication Data

US 2004/0071156 A1    Apr. 15, 2004

(30) Foreign Application Priority Data

Dec. 18, 2000   (DE) ................................ 100 63 081

(51) Int. Cl.
*H04L 12/66* (2006.01)
(52) U.S. Cl. .................. 370/463; 370/242; 370/244
(58) Field of Classification Search ........ 370/241–242, 370/244, 248, 250, 352–353, 356–360, 400, 370/422, 463, 465–467; 379/1.01, 9, 9.05, 379/15.01, 26.01
See application file for complete search history.

(56) References Cited

U.S. PATENT DOCUMENTS

| | | | | |
|---|---|---|---|---|
| 5,949,762 | A * | 9/1999 | Green et al. ................. | 370/259 |
| 6,285,680 | B1 * | 9/2001 | Steinka et al. ............... | 370/431 |
| 6,400,711 | B1 * | 6/2002 | Pounds et al. ............... | 370/353 |
| 6,498,791 | B2 * | 12/2002 | Pickett et al. ................ | 370/353 |
| 6,553,116 | B1 * | 4/2003 | Vander Meiden ...... | 379/355.08 |
| 2001/0007555 | A1 * | 7/2001 | Sasagawa et al. .......... | 370/359 |
| 2004/0037273 | A1 * | 2/2004 | Lobig .......................... | 370/356 |

* cited by examiner

*Primary Examiner*—Binh K. Tieu
(74) *Attorney, Agent, or Firm*—Bell, Boyd & Lloyd LLP

(57) ABSTRACT

The invention relates to a device and to a method for the packet-based access of classical ISDN/PSTN subscribers to a switching system. The convergence of packet-based networks and TDM networks leads to a situation where classical analogous and ISDN subscribers and private branch exchanges have to be accessed via packet-based transmission methods. Especially for the case of a failure of, for example, the subscriber terminals TNE or switching system-related devices or intervening communication paths, it must be made sure that substitute connections can be made and stable connections can be maintained. This problem is solved by the present invention by providing a peripheral adaptation device, integrated into the periphery of the switching system, and being suitable for the adaptation of the messages used on the interface between subscriber terminal and peripheral adaptation device, to the requirements of the plurality of peripheral devices associated with the TNE port. Furthermore, software functions are provided for treating the failure of, for example, the subscriber terminal, the one peripheral adaptation device or one of the associated peripheral devices of the switching system. The interaction of said failure treatment software functions controls the substitute connection and restart of failed peripheral devices, peripheral adaptation devices and communication paths to subscriber terminals.

14 Claims, 3 Drawing Sheets

ND METHOD FOR THE PACKET BASED ACCESS OF CLASSICAL ISDN/PSTN SUBSCRIBERS TO A SWITCHING SYSTEM

CLAIM FOR PRIORITY

This application claims priority to International Application No. PCT/DE01/04238 which was published in the German language on Jun. 27, 2002.

TECHNICAL FIELD OF THE INVENTION

The invention relates to a system and method for packet-based access of classical ISDN/PSTN subscribers to a switching system.

BACKGROUND OF THE INVENTION

Subscriber line concentrators (Remote Switching Units, RSU) or subscriber access networks (Access Networks, AN) are used to connect conventional analog and ISDN subscribers and private branch exchanges. Both represent switching-center-external devices that are connected via concentrating interfaces to the peripheral devices of the exchange.

In line with their respective definition, the subscriber line concentrators/subscriber access networks have clearly established mechanisms for controlling the subscriber signaling to the peripheral equipment of the switching system. Signaling facilities for controlling the subscriber line concentrators/subscriber access networks themselves are provided at the same time. These affect, for example, the connection of speech channels of the subscriber connection or of the extension to speech channels of the interface of the subscriber line connection concentrator/subscriber access network to the peripheral equipment of the switching node. The operating status of the subscriber connection and extension are also matched on this path between the subscriber line concentrator/subscriber access network and the switching system.

The exchange of subscriber signaling and control information is normally message-based in the manner specified by the interface definition. Typically, the complete interface is PCM-based and certain time slots are reserved for message-based transmission of subscriber/extension signaling and control information.

The V5.2 interface is an example of a concentrating interface between a subscriber access network and a local exchange. This provides that ISDN signaling, ISDN packet data on the D channel and message-based analog signaling (PSTN) are transmitted in time slots of the interface defined in accordance with definable standard predetermined time slots of the interface. For control of the subscriber access network, signaling protocols are provided that affect the forwarding of information through the subscriber access network, the matching of the port and PCM route states and also the substitute switching of failed signaling channels.

With regard to the definition, proprietary message-based concentrating interfaces can differ substantially from the specifications of the V5.2 standard. All message-based interfaces to subscriber line concentrators/subscriber access networks have something in common, they transmit subscriber signaling information (ISDN signaling messages, ISDN packet data, PSTN messages) as well as the control information for routing or for port status matching in certain time slots of a TDM-based interface.

The convergence of packet-based networks and TDM networks leads to a situation where conventional analog and ISDN subscribers and private branch exchanges have to be accessed using packet-based transmission methods.

A highly efficient access to the Internet can be achieved via xDSL routes to the subscriber connection or via cable networks. This makes sufficient bandwidth available in the subscriber area to be able to additionally handle narrowband conventional telephony/fax traffic via the same access line. From the point of view of the subscriber, additional connectability of conventional subscriber terminals and private branch exchanges should be possible. In addition, all the subscriber performance features known from the conventional PSTN/ISDN networks should still remain available. The user data necessary for switching is, however, transmitted packet-based, in contrast to the situation of a subscriber line concentrator/subscriber access network. The same applies to the signaling.

In this situation, the problem arises of connecting conventional subscribers or extensions (i.e. POTS, ISDN BA, ISDN PRI) that are switched via subscriber terminals (e.g. IAD of an xDSL route, set-top box of a cable network) with access to a packet network, in such a way that all conventional subscriber performance features (including D channel packet data) are available in principle. Furthermore, the reusability of the hardware and software functions of a conventional exchange should be retained. It should be possible to supply user data flows, preferably packet based, or, as an option, via TDM technology to the exchange, and transmit signaling information and ISDN-D channel packet data packet-based to the exchange.

According to the prior art, this problem is solved by controlling the aforementioned conventional subscribers as part of a subscriber access network. This has central components (such as IAT) that convert the narrowband user data flow to TDM technology and prepare signaling and user data flows in the form of a V5.2 interface. The user data flows are then processed in a conventional local exchange of the PSTN/ISDN network. The input and output flows of broadband traffic are controlled by suitable upstream multiplexers. The relevant conditions are schematically shown in FIG. 1.

Accordingly, a subscriber access network AN is shown that supplies information on a plurality of subscriber terminals to the peripheral devices of an exchange LE. A device IAD that supports specific functions of the xDSL transmission method is provided as a subscriber access device. In a multiplexer DSLAM, narrowband information is separated from broadband information and the xDSL route is closed. The speech and signaling information is applied, IP based, via an ATM network as a carrier of a device IAT that forms the head end of the subscriber access network AN. The latter passes the speech and signaling information via a V5.2 interface to a local exchange LE.

The advantages of the concept shown here are on the one hand the use of an existing concentrating interface and on the other hand the availability of all the subscriber performance features supported by the exchange. The decisive disadvantage on the other hand is in the use of TDM technology in an exchange operating in an environment of converging networks. There is also a deterioration of the speech quality due to the, sometimes avoidable, conversion of the user data flow between TDM technology with Codec G.711 and the packet-based transmission by means of a generally compressing Codec such as G.723.1.

SUMMARY OF THE INVENTION

The the invention shows conventional subscribers connected to an exchange using simple means via packet-based transmission methods and stable connections being maintained in the event of failure of communication paths.

One advantage of the invention is that in the event of loss of communication with the exchange the subscriber terminal near the subscriber automatically attempts to re-establish this through several available paths. Impermissible provision of switching resources, for example the switching of a user channel to a remote subscriber is also automatically terminated by the subscriber terminal device in the event of loss of communication between the subscriber terminal device and the exchange.

Another advantage is that the exchange actively carries out a cyclical check for availability of subscriber terminal devices, with, in particular, ports at subscriber terminal devices identified as unavailable and ports with a switching activity (e.g. ports with connected user channels) being checked. This results in a current status picture of the availability in the switching system and thus reduces the dummy load that would arise due to attempts to connect unavailable ports. Furthermore, ports can, after repair, be automatically and quickly switched again to a state where they are available for switching and connections already switched, by means of which one of the participating user terminal devices can no longer be reached by signaling by the switching system, can be quickly and reliably cleared down and the associated call charge metering thus stopped.

It is also advantageous that in the event of failure of a peripheral component of the switching system necessary for switching a port to a subscriber terminal device, switching resources of directly affected connections can be released. Connections can, however, continue to be maintained in a stable voice status, generally even through a failure situation, by requesting the switching status in the subscriber terminal devices and the participating media gateways.

BRIEF DESCRIPTION OF THE DRAWINGS

The invention is explained in more detail using an exemplary embodiment.

In the drawings.

DETAILED DESCRIPTION OF THE INVENTION

Figure 1:
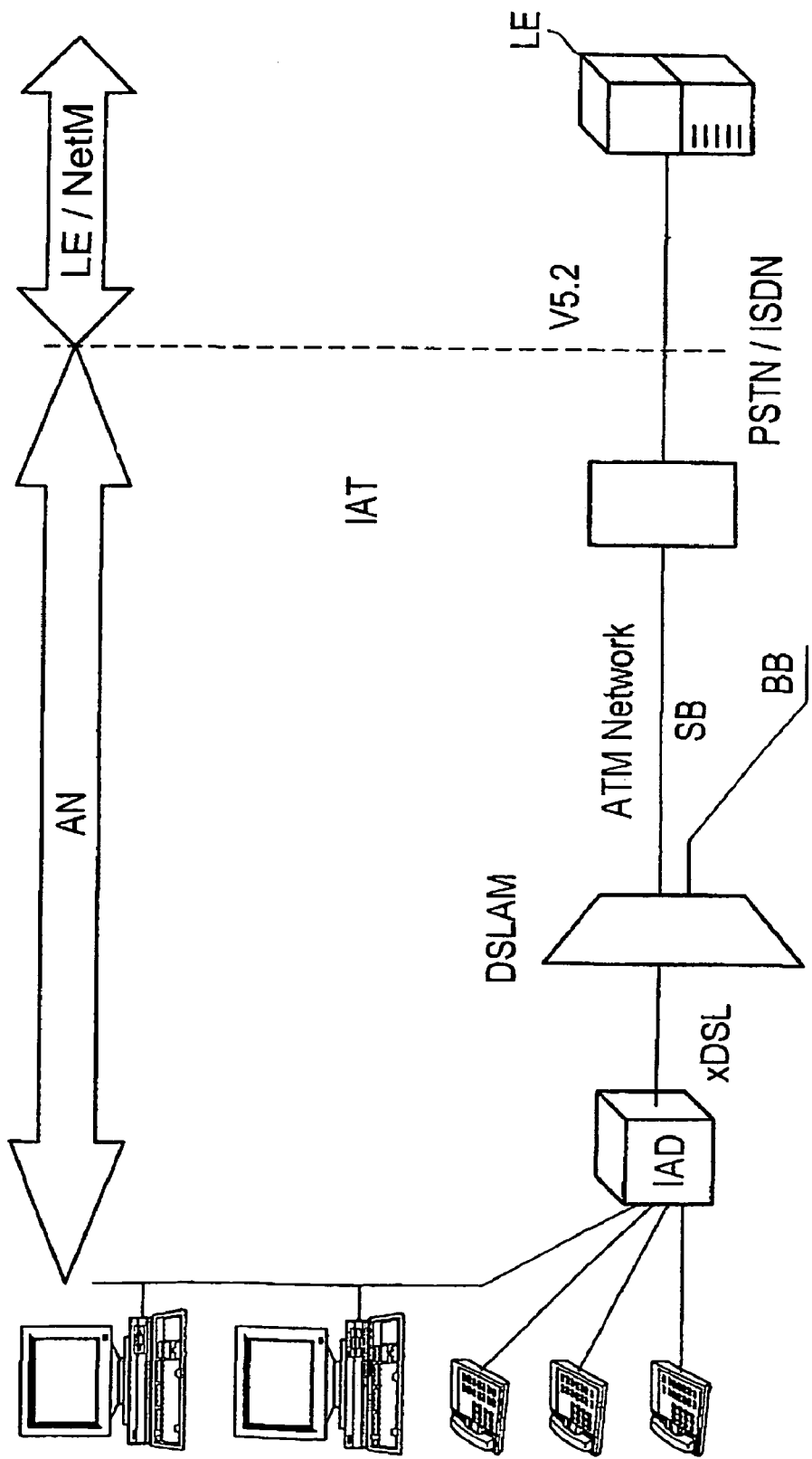
FIG. 1 shows the relationships in the subscriber access network according to the prior art.
Figure 2:
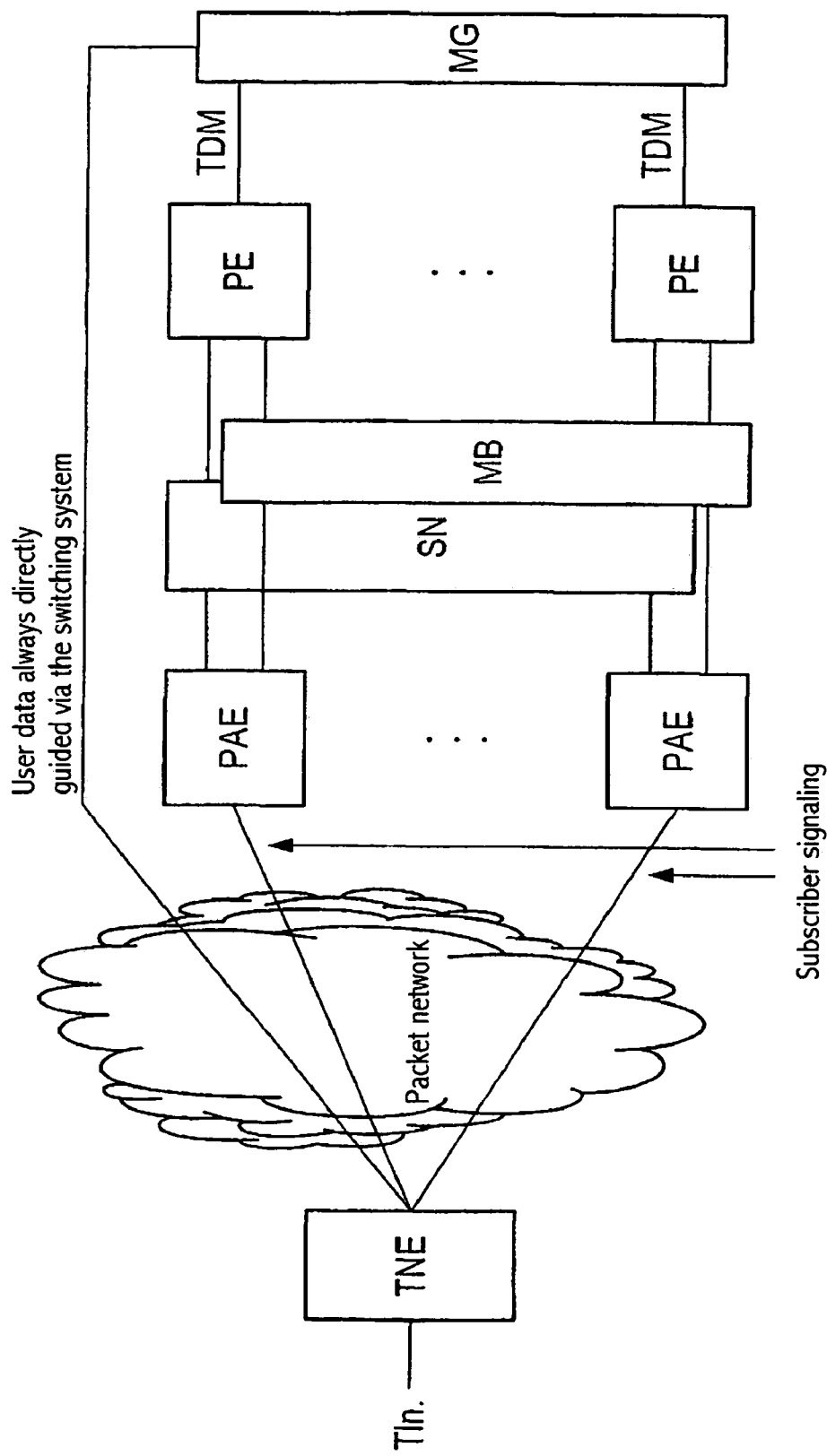
FIG. 2 shows a concentrating interface with forced user data conversion.

FIG. 2 shows a subscriber terminal device TNE with the conventional subscriber interfaces (a/b wire, S0, S2M). This terminates the physical connection lines of POTS, ISDN BA and ISDN PRI. The subscriber terminal device TNE is essentially identical to that in accordance with the prior art, shown in FIG. 1. It has access to at least two peripheral adaptation devices PAE of the exchange, with this access being packet-based.

The peripheral adaptation devices PAE also shown here are peripheral components of the exchange. They have access to the message distribution system MB of the exchange. In addition, there can also be access to the switching network SN, with it being possible for PCM-based interfaces to be present at the peripheral adaptation device PAE as an alternative.

Finally, peripheral devices PE of the exchange with access to the message distribution system MB and switching network SN are provided. A plurality of peripheral devices PE assigned to a concentrating interface provides the switching function for this concentrating interface. For this purpose, a peripheral device PE in conventional use terminates several PCM paths of this concentrating interface. If ISDN packet data is supported on the D channel, the transfer function for D channel packet data to the packet handler interface is also provided by the aforementioned plurality of peripheral devices PE assigned to the concentrating interface.

When a subscriber terminal device TNE is switched on, it attempts to establish communication with one of the peripheral adaptation devices PAE associated with it. The packet addresses of the associated peripheral adaptation devices PAE in this case can be stored locally in the subscriber terminal device TNE. Optionally, they can be requested when the management system responsible for the network is started up. If the communication with the peripheral adaptation device PAE in question fails, a new communication attempt with a further associated peripheral adaptation device PAE takes place. The communication attempt with one of the peripheral adaptation devices PAE is cyclically repeated in the event of failure.

When the communication to a peripheral adaptation device PAE is established, subscriber signaling takes place transparently for ISDN subscribers and extensions. This means that messages arriving via the D channel are sent packet-based in the direction of the peripheral adaptation device PAE. Messages sent to the peripheral adaptation device PAE contain the packet address of the subscriber terminal device TNE supplemented by the identifier of the relevant port or packet address, from which the transmitting D channel is clearly shown. Messages sent from the peripheral adaptation device PAE to the subscriber terminal device TNE include the packet address of the subscriber terminal device TNE supplemented by the identifier of the relevant port or a packet address from which the receiving D channel is clearly derived.

Signaling messages and packet data on the D channel are transmitted in the same way. Transmission of the ISDN L2 can take place unprotected, which is completely adequate, particularly in good packet networks. To improve the transmission quality (message sequence, delays), the ISDN L2 is preferably completed in the subscriber terminal device TNE and a protected protocol is used between this and the peripheral adaptation device PAE.

For subscriber access networks with analog signaling, the line signals in the subscriber terminal device TNE are converted to switching messages or, in the opposite direction, switching messages are converted to line signals. These are exchanged in the same way between the subscriber terminal device TNE and the peripheral adaptation device PAE as is the case for signaling messages of the ISDN subscriber to the subscriber terminal device TNE. If necessary, a protocol different from the ISDN case can be used. The analog port can be addressed using a packet address for each analog port or via a packet address for several analog ports at the subscriber terminal device TNE, supplemented by a port identifier.

Switching orders for a channel for a port at the subscriber terminal device TNE and, if necessary, the availability status of the port, are exchanged between the subscriber terminal device TNE and peripheral adaptation device PAE. A packet-based protocol that covers the aforementioned function is used for this purpose.

If the concentrating interface of the exchange is formed in such a way that a port has access to the switching system via several communication channels at the same time (such as for example is the case when operating with load sharing), communication links between the subscriber terminal device TNE and several peripheral adaptation devices PAE are established and simultaneously used in this present sense.

To simplify the description, only the case of the assignment of a port to a maximum of one communication for ISDN signaling, ISDN D channel packet data and/or PSTN signaling is considered in each case, all of which are transmitted via the same peripheral adaptation device PAE. If an existing communication link via a peripheral adaptation device PAE is broken off, the subscriber terminal device TNE cyclically attempts to reestablish a communication link with a different peripheral adaptation device PAE. To do this, it stops the packet-based user data flows associated with the active ports.

The functions of the peripheral adaptation device PAE serve to adapt the messages used on the interface between the subscriber terminal device TNE and peripheral adaptation device PAE to the needs of the concentrating interface assigned to the TNE port.

Thus, particularly the address conversion between the addressing used for the TNE port and the exchange-internal address of the port takes place at the concentrating interface assigned to the port. Furthermore, the protocol conversion of the subscriber signaling of the messages used in the direction of the subscriber terminal device TNE to the protocol used for the particular signaling channels of the concentrating interface is also undertaken.

This enables the forwarding of the ISDN signaling data between peripheral adaptation devices PAE and the peripheral devices PE. This takes place, TDM-based, via the switching network to the peripheral devices PE, that terminate the respective signaling channels. To this end, the system-internal NUC connections (nailed up connections) established at system runup are used. The distribution of the signaling messages of the subscriber terminal device TNE to a plurality of such fixed NUC connections takes place by means of the associated concentrating interface, the port address and the message type. If the message distribution system supports a message transfer of adequate performance between the peripheral device PE and peripheral adaptation device PAE, the message transmission by means of NUC and the switching network can also be omitted, and as an alternative the message distribution system can be used to transmit the signaling messages between the peripheral device and peripheral adaptation device.

In this way, the peripheral adaptation device PAE creates the conditions whereby in the peripheral device PE associated with the concentrating interface of the switching system the signaling of the subscribers to the subscriber terminal device TNE occurs in the same manner as if it had been carried via an intervening subscriber access network AN using TDM technology. Signaling data is processed in the normal manner in the concentrating interface. The D channel packet data is forwarded to the packet handler interface.

The signaling required for the control of the concentrating interface necessary to effect switching and matching of the port status also takes place via a peripheral adaptation device PAE, with this also being carried out via an NUC or via the message distribution system.

Two types of concentrating interfaces are enabled by means of the aforementioned method.

The first is, as shown in FIG. 2, where it always enters the user data channels of the ports at the subscriber terminal device TNE via a media gateway MG in a peripheral device PE assigned to the call for switching. This type of connection particularly provides all the subscriber performance features for the port (concentrating interface with forced user data conversion).

Figure 3:
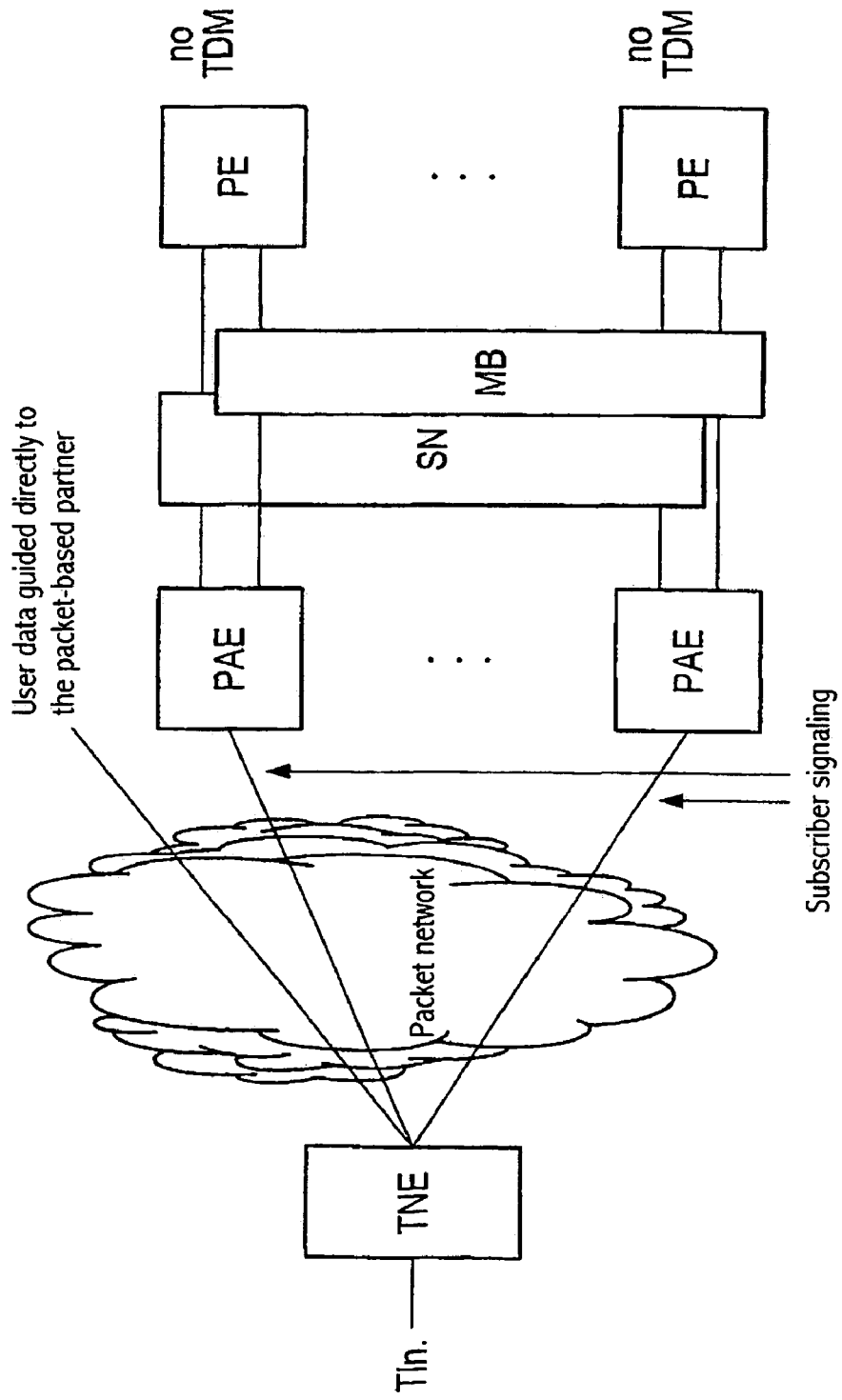
FIG. 3 shows a concentrating interface without forced user data conversion.

The second type of concentrating interface dispenses with, as shown in FIG. 3, the unconditional conversion of the user channel to TDM format and thus enables the direct exchange of user data between two subscribers at the subscriber terminal device TNE by bypassing the exchange. This can have limitations with regard to the availability of the subscriber performance features (concentrating interface without forced user data conversion).

If the peripheral adaptation device PE when establishing a connection outputs switching orders in the direction of the subscriber line concentrator, subscriber access network, these are converted in the peripheral adaptation device PAE to setting instructions to the subscriber terminal device TNE and the interposed media gateway MG.

If more complex subscriber terminal devices (TNE variants), that have to be combined in shelves or cabinets and perhaps use higher-level subscriber functional units and transmission devices, are used, the functionality of a subscriber access network required for this can also be provided by the peripheral adaptation device PAE. The data structures required for the alarm and maintenance functions are held and maintained in the peripheral adaptation device PAE. The necessary interface to the management system is held separate from that of the switching system, for advantageous reduction of the complexity of the overall system, so that then the functions of a local exchange as well as those of a local distribution network are provided without the latter being provided as a separate device.

What is claimed is:

1. Method for connecting conventional analog and ISDN subscribers to a switching system, with the subscriber signaling between a subscriber terminal device (TNE) and the switching system being transmitted, packet-based, via a network and with a plurality of such subscribers being assigned in each case to a common set of peripheral devices (PE) of the switching system, characterized in that, at least one peripheral adaptation device (PAE) is provided, that is arranged in the periphery of the switching system and is used for the adaptation of the messages used on the interface between the subscriber terminal device (TNE) and peripheral adaptation device (PAE) serves the requirements of the set of peripheral devices (PE) assigned to the TNE port, software functions for dealing with failures in the subscriber terminal device (TNE) of at least one peripheral adaptation device (PAE) and the associated peripheral devices (PE) of the switching system are provided, due to the interaction of these software functions for dealing with failures the alternative routing and restoration of failed peripheral devices (PE), peripheral adaptation devices (PAE) and communication paths to subscriber terminal devices (TNE) are controlled.

2. Method in accordance with claim 1, characterized in that, in the event of loss of communication via a peripheral adaptation devices (PAE) communication via a further peripheral adaptation device (PAE) is established from the subscriber terminal device (TNE).

3. Method in accordance with claim 1, 2, characterized in that, in the event of failure of communication via all the peripheral adaptation devices (PAE) assigned to it, the subscriber terminal device (TNE) cyclically attempts to establish communication via a further peripheral adaptation device (PAE), the associated switching resources are released and the activated switching of user data flows of their connections are terminated.

4. Method in accordance with claims 1 to 3, characterized in that,
the failure and the restoration of availability of a connection at the subscriber terminal device is signaled to the switching system by the subscriber terminal device (TNE) via the communication with the peripheral adaptation device (PAE) and the picture of the status of a connection is held in the exchange and the switching availability of the connection is described in the switching system.

5. Method in accordance with claim 4, characterized in that,
the MGCP protocol or H.248 is used to signal the status of a connection at the subscriber terminal device (TNE) to the switching system.

6. Method in accordance with one of the preceding claims, characterized in that,
the connections reported at the subscriber terminal device (TNE) as failed are cyclically checked by the peripheral adaptation device (PAE) for restoration of availability.

7. Method in accordance with claim 6, characterized in that,
the MGCP protocol or H.248 is used to check the status of a connection at the subscriber terminal device (TNE) by means of the peripheral adaptation device (PAE) of the switching system.

8. Method in accordance with one of the preceding claims, characterized in that,
connections at the subscriber terminal device (TNE) that are active with regard to switching are cyclically checked for availability by the peripheral adaptation device (PAE), and if non-availability is determined, the switching and transactions are cleared down and the call charge metering for the relevant connection is stopped in the exchange.

9. Method in accordance with claim 8, characterized in that,
the MGCP protocol or H.248 is used for checking the active switching connections at the subscriber terminal device (TNE) by means of the peripheral adaptation device (PAE) of the switching system.

10. Method in accordance with one of the preceding claims, characterized in that,
in the event of failure of peripheral adaptation devices (PAE), stable connections are maintained by the redundant storage of switching states in a redundant peripheral adaptation device (PAE) or by recovery of the switching states by interrogating the participating subscriber terminal devices and media gateways after switching to a further peripheral adaptation device (PAE).

11. Method in accordance with one of the preceding claims, characterized in that,
in the event of failure of a peripheral device (PE), the through switching of connections that can no longer be operated is dealt with by utilizing the storage of the switching states in the peripheral adaptation devices (PAE) or by recovery of the switching states by interrogating the participating subscriber terminal devices and media gateways.

12. Method in accordance with claim 10 or 11, characterized in that,
the MGCP protocol or H.248 is used for the recovery of the switching states by interrogating the participating subscriber terminal devices (TNE) and media gateways.

13. Method in accordance with one of the preceding claims, characterized in that,
the failure of a subscriber terminal device (TNE) is detected by cyclic communication attempts of a peripheral adaptation device (PAE) and the non-availability of the associated connections is depicted.

14. Method in accordance with one of the preceding claims, characterized in that,
ports of a subscriber terminal device used in the switching system as connections not available for switching are not used even for terminating calls.

* * * * *